(12) United States Patent
Sakane et al.

(10) Patent No.: US 11,037,176 B2
(45) Date of Patent: Jun. 15, 2021

(54) SYSTEM, METHOD AND DEVICE FOR FOLDING SUBJECTS

(71) Applicants: Seven Dreamers Laboratories, Inc., Tokyo (JP); Panasonic Corporation, Osaka (JP); Daiwa House Industry Co., Ltd., Osaka (JP)

(72) Inventors: Shinichi Sakane, Tokyo (JP); Hiroshi Kitagawa, Tokyo (JP)

(73) Assignees: DAIWA House Industry Co., LTD, Osaka (JP); SBI Ventures Two Co., Ltd., Tokyo (JP); Panasonic Corporation, Osaka (JP)

( * ) Notice: Subject to any disclaimer, the term of this patent is extended or adjusted under 35 U.S.C. 154(b) by 187 days.

(21) Appl. No.: 15/577,473

(22) PCT Filed: May 27, 2016

(86) PCT No.: PCT/JP2016/065716
§ 371 (c)(1),
(2) Date: Nov. 28, 2017

(87) PCT Pub. No.: WO2016/194812
PCT Pub. Date: Dec. 8, 2016

(65) Prior Publication Data
US 2018/0150853 A1    May 31, 2018

(30) Foreign Application Priority Data
May 29, 2015  (JP) .............................. JP2015-110069

(51) Int. Cl.
*G06Q 30/02* (2012.01)
*G06Q 50/10* (2012.01)
(Continued)

(52) U.S. Cl.
CPC ......... *G06Q 30/0201* (2013.01); *D06F 89/02* (2013.01); *D06F 95/00* (2013.01);
(Continued)

(58) Field of Classification Search
None
See application file for complete search history.

(56) References Cited

U.S. PATENT DOCUMENTS 8,630,892 B2 *   1/2014   Bhalla ................... G06Q 30/02
                                                      705/7.31
2007/0021283 A1 *  1/2007   Leifer .................... D06F 93/00
                                                      493/23
(Continued)

FOREIGN PATENT DOCUMENTS

CN    103726262 A    4/2014
JP    2004-173729    6/2004
(Continued)

OTHER PUBLICATIONS

J. Stria et al., "Garment perception and its folding using a dual-arm robot," 2014 IEEE/RSJ International Conference on Intelligent Robots and Systems, Chicago, IL, 2014, pp. 61-67. (Year: 2014).*
(Continued)

*Primary Examiner* — Arif Ullah
(74) *Attorney, Agent, or Firm* — Morgan, Lewis & Bockius, LLP

(57) ABSTRACT

A server device is provided with: a receiver that receives subject data that are transmitted from one or more folding devices for folding subjects and that include related data on the subjects which are read from the subjects by the folding devices; a storage unit that stores aggregate data obtained by aggregating the subject data; an analyzer that performs an analysis on predetermined data contained in the aggregate data; and a provider that provides a result of the analysis by
(Continued)

the analyzer to a predetermined information processing device.

7 Claims, 14 Drawing Sheets

(51) Int. Cl.
*D06F 89/02* (2006.01)
*D06F 95/00* (2006.01)
*H04L 29/08* (2006.01)
*D06F 35/00* (2006.01)

(52) U.S. Cl.
CPC ............ *G06Q 30/02* (2013.01); *G06Q 50/10* (2013.01); *H04L 67/12* (2013.01); *H04L 67/22* (2013.01); *D06F 35/00* (2013.01)

(56) References Cited

U.S. PATENT DOCUMENTS

2012/0196734 A1  8/2012  Yoshimasa et al.
2012/0228340 A1  9/2012  Shinichi et al.
2013/0249157 A1  9/2013  Yoshimasa et al.

FOREIGN PATENT DOCUMENTS

| | | |
|---|---|---|
| JP | 4899223 | 3/2012 |
| JP | 5299934 | 9/2013 |
| JP | 5317239 | 10/2013 |

OTHER PUBLICATIONS

International Patent Application No. PCT/JP2016/065716, International Search Report, dated Aug. 30, 2016, 5 pages.
International Patent Application No. PCT/JP2016/065716, Written Opinion of the International Searching Authority, dated Aug. 30, 2016, 9 pages.

* cited by examiner

FIG. 6

| SALES COMPANY | GARMENT ID | GARMENT TYPE | PURCHASE DATE | USER | ONGOING-USAGE | TOTAL NUMBER OF PROCESSING OPERATIONS | PROCESSING FREQUENCY | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| | | | | | | | YEAR 2010 | | | | | | | | | | | | YEAR 2011 | | | | | | | | | | | | | ... |
| | | | | | | | 1 | 2 | 3 | 4 | 5 | 6 | 7 | 8 | 9 | 10 | 11 | 12 | 1 | 2 | 3 | 4 | 5 | 6 | 7 | 8 | 9 | 10 | 11 | 12 | 1 | 2 | 3 | ... |
| COMPANY A | A-001 | LONG-SLEEVE SHIRT | 2011/1/1 | ADULT MALE | × | 43 | 5 | 5 | 4 | 4 | 1 | 0 | 0 | 0 | 2 | 4 | 4 | 4 | 4 | 4 | 3 | 3 | ... |
| COMPANY A | A-002 | LONG-SLEEVE SHIRT | 2011/1/15 | ADULT MALE | × | 39 | 3 | 4 | 3 | 4 | 2 | 0 | 0 | 0 | 3 | 3 | 3 | 3 | 4 | 3 | 3 | 3 | ... |
| COMPANY D | D-001 | LONG-SLEEVE SHIRT | 2011/2/7 | ADULT MALE | ○ | 37 | — | 4 | 3 | 4 | 3 | 1 | 0 | 0 | 1 | 3 | 4 | 4 | 3 | 2 | 3 | 5 | ... |
| COMPANY B | B-001 | LONG-SLEEVE SHIRT | 2011/1/2 | ADULT FEMALE | × | 16 | 3 | 2 | 2 | 1 | 0 | 0 | 0 | 0 | 0 | 0 | 2 | 3 | 3 | 3 | 0 | 0 | ... |
| COMPANY B | B-002 | LONG-SLEEVE SHIRT | 2011/1/2 | ADULT FEMALE | × | 46 | 6 | 7 | 4 | 4 | 1 | 1 | 0 | 0 | 0 | 0 | 6 | 5 | 5 | 5 | 5 | 2 | ... |
| COMPANY C | C-001 | LONG-SLEEVE SHIRT | 2011/1/2 | ADULT FEMALE | × | 9 | 3 | 2 | 2 | 3 | 1 | 0 | 0 | 0 | 0 | 0 | 0 | 0 | 0 | 0 | 0 | 0 | ... |
| COMPANY C | C-002 | LONG-SLEEVE SHIRT | 2011/1/2 | ADULT FEMALE | × | 28 | 5 | 5 | 3 | 3 | 0 | 0 | 0 | 0 | 0 | 2 | 2 | 2 | 2 | 4 | 4 | 2 | ... |
| COMPANY A | A-003 | LONG-SLEEVE SHIRT | 2011/1/3 | BOY | × | 71 | 8 | 9 | 7 | 6 | 3 | 0 | 1 | 0 | 2 | 8 | 9 | 8 | 8 | 8 | 8 | 3 | ... |
| COMPANY A | A-004 | LONG-SLEEVE SHIRT | 2011/1/3 | BOY | × | 17 | 4 | 3 | 4 | 3 | 2 | 1 | 0 | 0 | 0 | 0 | 0 | 0 | 0 | 0 | 0 | 0 | ... |
| COMPANY A | A-005 | LONG-SLEEVE SHIRT | 2011/1/3 | BOY | × | 42 | 6 | 5 | 5 | 3 | 0 | 0 | 0 | 0 | 0 | 4 | 4 | 3 | 4 | 4 | 4 | 4 | ... |
| COMPANY A | A-006 | LONG-SLEEVE SHIRT | 2011/1/3 | BOY | × | 37 | 3 | 4 | 3 | 3 | 1 | 0 | 1 | 0 | 1 | 2 | 4 | 5 | 6 | 2 | 2 | 2 | ... |
| COMPANY A | A-007 | LONG-SLEEVE SHIRT | 2011/1/3 | BOY | × | 34 | 3 | 3 | 3 | 4 | 0 | 0 | 0 | 0 | 1 | 4 | 5 | 3 | 3 | 4 | 4 | 4 | ... |
| COMPANY A | A-008 | LONG-SLEEVE SHIRT | 2012/1/4 | BOY | × | 13 | — | — | — | — | — | — | — | — | — | — | — | — | — | — | 5 | 4 | ... |
| COMPANY A | A-009 | LONG-SLEEVE SHIRT | 2012/1/4 | BOY | × | 6 | — | — | — | — | — | — | — | — | — | — | — | — | — | — | 3 | 2 | ... |
| COMPANY D | D-002 | LONG-SLEEVE SHIRT | 2011/12/25 | ADULT MALE | ○ | 13 | — | — | — | — | — | — | — | — | — | — | — | 1 | — | — | 4 | 4 | ... |
| COMPANY D | D-003 | LONG-SLEEVE SHIRT | 2011/12/25 | ADULT MALE | ○ | 16 | — | — | — | — | — | — | — | — | — | — | — | 1 | — | — | 6 | 5 | ... |
| COMPANY B | B-003 | LONG-SLEEVE SHIRT | 2012/1/2 | ADULT FEMALE | × | 7 | — | — | — | — | — | — | — | — | — | — | — | — | — | — | 3 | 1 | ... |
| COMPANY B | B-004 | LONG-SLEEVE SHIRT | 2012/1/2 | ADULT FEMALE | × | 13 | — | — | — | — | — | — | — | — | — | — | — | — | — | — | 4 | 5 | ... |
| ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |

FIG. 8

| SALES COMPANY | GARMENT TYPE | GARMENT ID | USER | NUMBER OF DATA AGGREGATIONS | | | TOTAL NUMBER OF PROCESSING OPERATIONS | | | NUMBER OF PROCESSING FOR EACH YEAR | | | | |
|---|---|---|---|---|---|---|---|---|---|---|---|---|---|---|
| | | | | TOTAL | USAGE ENDED | IN-USE | TOTAL | USAGE ENDED | IN-USE | NUMBER OF PROCESSING 2010 | NUMBER OF PROCESSING 2011 | NUMBER OF PROCESSING 2012 | NUMBER OF PROCESSING 2013 | NUMBER OF PROCESSING 2014 |
| COMPANY A | LONG-SLEEVE SHIRT | A-001 | ADULT MALE | 1033 | 683 | 350 | 53 | 72 | 16 | 21 | 13 | 12 | 4 | 3 |
| COMPANY A | LONG-SLEEVE SHIRT | A-002 | ADULT MALE | 876 | 578 | 298 | 34 | 40 | 22 | 13 | 8 | 5 | 5 | 3 |
| COMPANY A | LONG-SLEEVE SHIRT | A-003 | BOY | 209 | 137 | 72 | 73 | 92 | 37 | 12 | 23 | 14 | 18 | 6 |
| COMPANY A | LONG-SLEEVE SHIRT | A-004 | BOY | 390 | 192 | 198 | 10 | 15 | 5 | 3 | 2 | 2 | 2 | 1 |
| COMPANY A | LONG-SLEEVE SHIRT | A-005 | BOY | 240 | 147 | 93 | 30 | 38 | 17 | 7 | 14 | 3 | 3 | 3 |
| COMPANY A | LONG-SLEEVE SHIRT | A-006 | BOY | 150 | 77 | 73 | 22 | 27 | 17 | 5 | 5 | 6 | 2 | 4 |
| COMPANY A | LONG-SLEEVE SHIRT | A-007 | BOY | 300 | 139 | 161 | 40 | 49 | 32 | 8 | 8 | 6 | 12 | 6 |
| COMPANY A | LONG-SLEEVE SHIRT | A-008 | BOY | 287 | 107 | 180 | 37 | 45 | 32 | 5 | 6 | 9 | 9 | 8 |
| COMPANY A | LONG-SLEEVE SHIRT | A-009 | BOY | 124 | 51 | 73 | 12 | 15 | 10 | 2 | 3 | 3 | 3 | 1 |
| COMPANY A | LONG-SLEEVE SHIRT | A-010 | ADULT MALE | 143 | 132 | 11 | 18 | 19 | 6 | 3 | 6 | 2 | 3 | 4 |
| COMPANY B | LONG-SLEEVE SHIRT | B-001 | ADULT FEMALE | 2086 | 957 | 1129 | 23 | 29 | 18 | 4 | 4 | 8 | 4 | 3 |
| COMPANY B | LONG-SLEEVE SHIRT | B-002 | ADULT FEMALE | 1295 | 546 | 749 | 58 | 76 | 45 | 6 | 12 | 20 | 10 | 10 |
| COMPANY B | LONG-SLEEVE SHIRT | B-003 | ADULT FEMALE | 3890 | 2500 | 1390 | 24 | 30 | 13 | 3 | 5 | 8 | 6 | 2 |
| COMPANY B | LONG-SLEEVE SHIRT | B-004 | ADULT FEMALE | 2199 | 1001 | 1198 | 68 | 89 | 50 | 7 | 13 | 29 | 10 | 9 |
| COMPANY B | LONG-SLEEVE SHIRT | B-005 | ADULT FEMALE | 1190 | 693 | 497 | 21 | 29 | 10 | 3 | 5 | 10 | 2 | 1 |
| COMPANY B | LONG-SLEEVE SHIRT | B-006 | ADULT FEMALE | 2312 | 1013 | 1299 | 53 | 68 | 41 | 8 | 9 | 20 | 6 | 10 |
| COMPANY C | LONG-SLEEVE SHIRT | C-001 | ADULT FEMALE | 538 | 406 | 132 | 12 | 14 | 6 | 3 | 4 | 2 | 2 | 1 |
| COMPANY C | LONG-SLEEVE SHIRT | C-002 | ADULT FEMALE | 498 | 355 | 143 | 16 | 18 | 11 | 2 | 5 | 3 | 3 | 2 |
| COMPANY C | LONG-SLEEVE SHIRT | C-003 | ADULT FEMALE | 309 | 198 | 111 | 15 | 17 | 11 | 3 | 3 | 4 | 3 | 2 |
| COMPANY C | LONG-SLEEVE SHIRT | C-004 | ADULT FEMALE | 621 | 451 | 170 | 12 | 15 | 4 | 2 | 3 | 3 | 3 | 1 |
| COMPANY D | LONG-SLEEVE SHIRT | D-001 | ADULT MALE | 3209 | 1960 | 1249 | 72 | 86 | 50 | 12 | 30 | 14 | 8 | 8 |
| COMPANY D | LONG-SLEEVE SHIRT | D-002 | ADULT MALE | 2704 | 1384 | 1320 | 79 | 94 | 63 | 19 | 29 | 10 | 10 | 11 |
| COMPANY D | LONG-SLEEVE SHIRT | D-003 | ADULT MALE | 2889 | 1269 | 1620 | 89 | 102 | 79 | 16 | 36 | 15 | 12 | 10 |
| ... | ... | ... | ... | ... | ... | ... | ... | ... | ... | ... | ... | ... | ... | ... |

FIG. 9

| SALES COMPANY | GARMENT TYPE | GARMENT ID | USER | NUMBER OF DATA AGGREGATIONS | | | TOTAL NUMBER OF PROCESSING OPERATIONS | | | NUMBER OF PROCESSING FOR EACH YEAR | | | | |
|---|---|---|---|---|---|---|---|---|---|---|---|---|---|---|
| | | | | TOTAL | USAGE ENDED | IN-USE | TOTAL | USAGE ENDED | IN-USE | NUMBER OF PROCESSING 2010 | NUMBER OF PROCESSING 2011 | NUMBER OF PROCESSING 2012 | NUMBER OF PROCESSING 2013 | NUMBER OF PROCESSING 2014 |
| COMPANY A | LONG-SLEEVE SHIRT | A-001 | ADULT MALE | 1033 | 683 | 350 | 53 | 72 | 16 | 21 | 13 | 12 | 4 | 3 |
| COMPANY A | LONG-SLEEVE SHIRT | A-002 | ADULT MALE | 876 | 578 | 298 | 34 | 40 | 22 | 13 | 8 | 5 | 5 | 3 |
| COMPANY A | LONG-SLEEVE SHIRT | A-010 | ADULT MALE | 143 | 132 | 11 | 18 | 19 | 6 | 3 | 6 | 2 | 3 | 4 |
| COMPANY D | LONG-SLEEVE SHIRT | D-001 | ADULT MALE | 3209 | 1960 | 1249 | 72 | 86 | 50 | 12 | 30 | 14 | 8 | 8 |
| COMPANY D | LONG-SLEEVE SHIRT | D-002 | ADULT MALE | 2704 | 1384 | 1320 | 79 | 94 | 63 | 19 | 29 | 10 | 10 | 11 |
| COMPANY D | LONG-SLEEVE SHIRT | D-003 | ADULT MALE | 2889 | 1269 | 1620 | 89 | 102 | 79 | 16 | 36 | 15 | 12 | 10 |

FIG. 10

| SALES COMPANY | GARMENT TYPE | GARMENT ID | USER | NUMBER OF DATA AGGREGATIONS | | | TOTAL NUMBER OF PROCESSING OPERATIONS | | | NUMBER OF PROCESSING FOR EACH YEAR | | | | |
|---|---|---|---|---|---|---|---|---|---|---|---|---|---|---|
| | | | | TOTAL | USAGE ENDED | IN-USE | TOTAL | USAGE ENDED | IN-USE | NUMBER OF PROCESSING 2010 | NUMBER OF PROCESSING 2011 | NUMBER OF PROCESSING 2012 | NUMBER OF PROCESSING 2013 | NUMBER OF PROCESSING 2014 |
| COMPANY B | LONG-SLEEVE SHIRT | B-001 | ADULT FEMALE | 2086 | 957 | 1129 | 23 | 29 | 18 | 4 | 4 | 8 | 4 | 3 |
| COMPANY B | LONG-SLEEVE SHIRT | B-002 | ADULT FEMALE | 1295 | 546 | 749 | 58 | 76 | 45 | 6 | 12 | 20 | 10 | 10 |
| COMPANY B | LONG-SLEEVE SHIRT | B-003 | ADULT FEMALE | 3890 | 2500 | 1390 | 24 | 30 | 13 | 3 | 5 | 8 | 6 | 2 |
| COMPANY B | LONG-SLEEVE SHIRT | B-004 | ADULT FEMALE | 2199 | 1001 | 1198 | 68 | 89 | 50 | 7 | 13 | 29 | 10 | 9 |
| COMPANY B | LONG-SLEEVE SHIRT | B-005 | ADULT FEMALE | 1190 | 693 | 497 | 21 | 29 | 10 | 3 | 5 | 10 | 2 | 1 |
| COMPANY B | LONG-SLEEVE SHIRT | B-006 | ADULT FEMALE | 2312 | 1013 | 1299 | 53 | 68 | 41 | 8 | 9 | 20 | 6 | 10 |
| COMPANY C | LONG-SLEEVE SHIRT | C-001 | ADULT FEMALE | 538 | 406 | 132 | 12 | 14 | 6 | 3 | 4 | 2 | 2 | 1 |
| COMPANY C | LONG-SLEEVE SHIRT | C-002 | ADULT FEMALE | 498 | 355 | 143 | 16 | 18 | 11 | 2 | 5 | 3 | 3 | 2 |
| COMPANY C | LONG-SLEEVE SHIRT | C-003 | ADULT FEMALE | 309 | 198 | 111 | 15 | 17 | 11 | 3 | 3 | 4 | 3 | 2 |
| COMPANY C | LONG-SLEEVE SHIRT | C-004 | ADULT FEMALE | 621 | 451 | 170 | 12 | 15 | 4 | 2 | 3 | 3 | 3 | 1 |

SYSTEM, METHOD AND DEVICE FOR FOLDING SUBJECTS

CROSS-REFERENCE TO RELATED APPLICATIONS

This application is a U.S. National Phase Application under 35 U.S.C. 371 of International Application No. PCT/JP2016/065716 filed May 27, 2016, which claims priority to Japanese Patent Application No. 2015-110069 filed May 29, 2015, all of which are incorporated herein by reference in their entireties.

TECHNICAL FIELD

The present invention relates to a server device, a data providing method, a program, and a data processing system.

BACKGROUND ART

There have conventionally been known washing machines which read the garment information from the storage units attached to the garments, determine the washing operation conditions based on the garment information, and wash the garments according to the determined washing operation conditions (see Patent Document 1, for example).

There have also been developed folding machines capable of expanding or folding subjects such as garments by using the placement board or grasping portion (see Patent Documents 2 to 4, for example).

CITATION LIST

Patent Document

Patent Document 1: Patent Publication JP-A-2004-173729
Patent Document 2: Japanese Patent No. 4899223 (Specification)
Patent Document 3: Japanese Patent No. 5299934 (Specification)
Patent Document 4: Japanese Patent No. 5317239 (Specification)

SUMMARY

Technical Problem

Companies selling garments and other subjects (to be referred to as "sales companies" below) can obtain sales information such as how many of which subject were sold during a certain period, by using POS (Point of sale system) data. In addition to such obtainable sales information, the sales companies also wish to obtain usage information such as how subjects purchased by users are used, and make use of such usage information in the strategy for developing subjects.

In the prior art described in Patent Document 1, the garment information attached to garments are used inside the washing machines, but because communicating the garment information to the outside is not taken into consideration, use of information on purchased garments by the sales companies is not considered at all. For this reason, the sales companies typically carry out surveys or fixed-point observations by observers in order to obtain the usage information on purchased garments.

However, only a small amount of data is obtained through surveys, and surveys tend to be subjective. As with surveys, only a small amount of data is obtained through fixed-point observations, and the obtained data are usually qualitative data, and fixed-point observations are susceptible to observers and observation points. Specifically, data obtained through surveys and fixed-point observations by observers are not very reliable as the usage information. Therefore, the sales companies cannot properly understand the information about purchased subjects.

On the other hand, as described in Patent Documents 2 to 4 and the like, folding machines capable of automatically expanding and folding subjects have been developed. Unfortunately, with these folding machines as well, data read from subjects are merely used for the width adjustment at the time of folding the subjects, and thus remain in the folding machines; communicating the data to the outside is not taken into consideration (Patent Document 2, for example). The inventors of the techniques described in these documents, therefore, did not come up with an idea of understanding the data relating to the purchased subjects.

A predetermined aspect of the present invention aims to provide a server device, a data providing method, and a data processing system, which are capable of properly understanding data relating to subjects, such as purchased garments, by using data acquired by a device that performs folding and the like.

Solution to Problem

A server device according to one aspect of the present invention has: a receiver that receives subject data that are transmitted from one or more folding devices for folding subjects and that include related data on the subjects which are read from the subjects by the folding device; a storage unit that stores aggregate data obtained by aggregating the subject data; an analyzer that performs an analysis on predetermined data contained in the aggregate data; and a provider that provides a result of the analysis by the analyzer to a predetermined information processing device.

Advantageous Effects of Invention

According to the predetermined aspect of the present invention, information on subjects such as purchased garments can properly be understood by using data acquired by a device that performs folding and the like.

BRIEF DESCRIPTION OF DRAWINGS

FIG. 6 is a diagram showing an example of subject data stored in a storage unit of the folding device.

FIG. 8 is a diagram showing an example of aggregate data stored in a storage unit of the server device.

FIG. 9 is a diagram showing an example of a filtering result of analytical processing A.

FIG. 10 is a diagram showing an example of a filtering result of analytical processing B.

DESCRIPTION OF EMBODIMENTS

An embodiment of the present invention is described hereinafter in detail with reference to the accompanying drawings.

Embodiment

<System Configuration>

Figure 1:
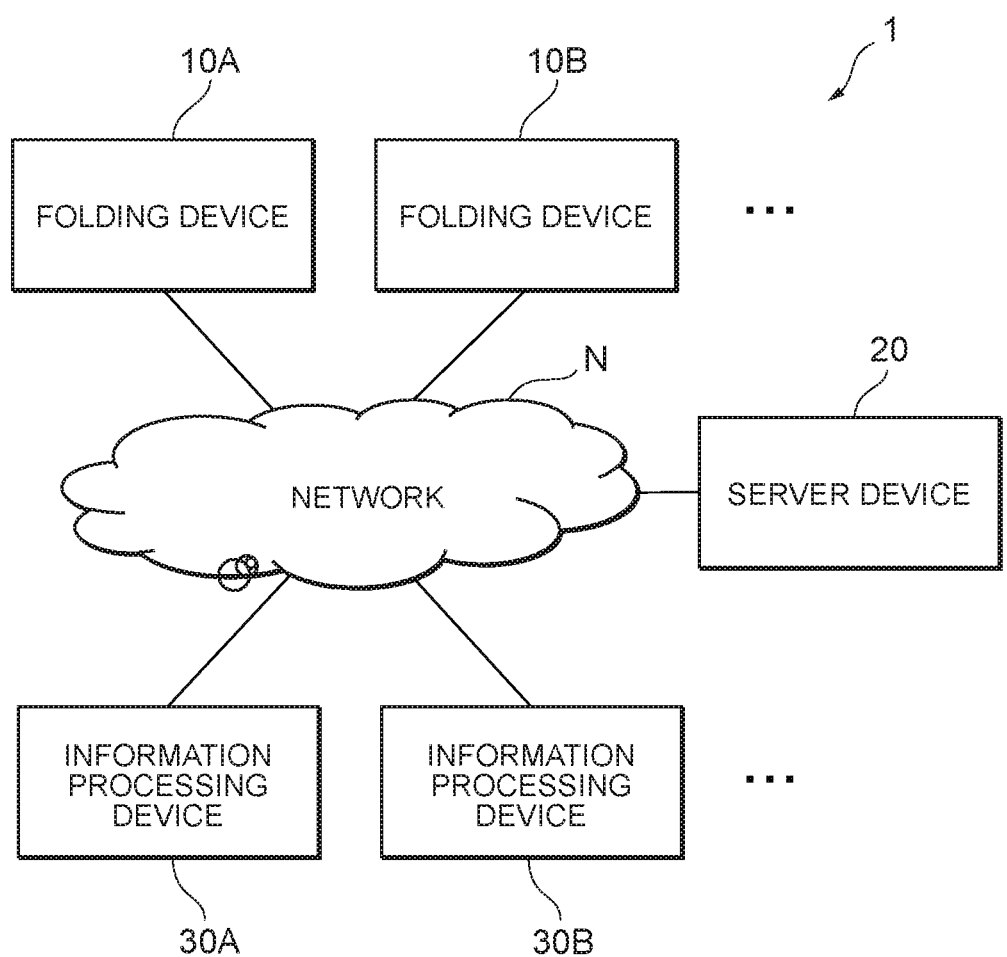
FIG. 1 is a diagram showing an example of the schematic configuration of a data processing system according to an embodiment.

FIG. 1 is a diagram showing an example of the schematic configuration of a data processing system 1 according to one embodiment of the present invention (system configuration diagram). As shown in the diagram, the data processing system 1 is configured by connecting a plurality of folding devices 10A, 10B, . . . , a server device 20, and a plurality of information processing devices 30A, 30B, . . . by a network N so as to be mutually communicable. In the following description, the folding devices are described using reference numeral 10 unless they need to be distinguished individually. Also, the information processing devices are described using reference numeral 30 unless they need to be distinguished individually. It should be noted that the number of folding devices 10 and the number of information processing devices 30, which are connected to the network N, may each be one.

The folding device 10 is connected to the network N and capable of automatically or semi-automatically expanding, recognizing, or folding subjects. The folding device 10 may sequentially fold subjects that are thrown in one by one by a user, or may select, one by one, subjects that are thrown in at once and sequentially fold the selected subjects.

The folding device 10 may not only function to simply fold, but also function to wash and/or dry. For instance, the folding device 10 may use a robot arm to pick up subjects one by one from a washer tub that has completed drying, and then fold these picked up subjects.

Note that any method may be used as an expanding method or a folding method of the folding device 10 for folding subjects, as long as the subjects can be folded eventually (including sorting the subjects that are not folded).

The term "subjects" typically means objects to be washed, dried and the like, examples of which include pieces of cloth such as garments and towels, films, paper, sheets, and other deformable thin objects, and the shapes of these objects may be a rectangle such as towels or a rough rectangle such as T-shirts and running shirts. These deformable thin objects may be contained in net bags (e.g., laundry net bags) when washed, dehydrated, dried or the like. In a case where the folding device 10 is provided with a washing and/or drying function, the subjects may be of any objects that can be used in washing and/or drying.

The folding device 10 reads, from the subjects to be folded, data relating to the subjects (to be referred to as "related data" hereinafter), and transmits data containing the related data (to be referred to as "subject data" hereinafter) to the server device 20 through the network N.

The term "related data" means, for example, data that include at least one of the followings: data on a sales company selling the subjects, identification information of the subjects, data on types of the subjects, data on purchase dates of the subjects, and data on users who use the subjects.

The term "subject data" means data that include at least one of the followings: the number of processing performed on each of the subjects by the folding device 10 for each predetermined period, a total number of processing operations performed on each of the subjects by the folding device 10, and data indicating whether the subjects are ongoing used or not. In other words, "subject data" means data that include data relating to the number of times the subjects are processed by the folding device 10.

When the folding device 10 reads the related data, a reading device thereof may optically, for example, read the related data when the user passes the subjects one by one over the position where the reading device is located, as the user throws the subjects one by one into the folding device 10. In addition, the reading device may optically read the related data as the subjects are moved to the predetermined position of the reading device as a result of a hold mechanism being moved when the subjects are each expanded or folded, the hold mechanism holding the subjects. Alternatively, the reading device may be disposed in a position on which the subjects are placed, so that the reading device can read the related data as the subjects are placed thereon. In a case where wireless IC chips such as RFID (Radio Frequency IDentification) tags are attached to the subjects, the reading device may read the related data by means of the electromagnetic induction or radio waves.

The server device 20 is a server computer connected to the network N and operates a predetermined server program therein to realize a server function. In the embodiment, the server device 20 can compile the subject data transmitted from the folding device 10, aggregate the compiled subject data, analyze the aggregate data, and provide a sales company (to be referred to as "predetermined company" hereinafter) and the like with analysis results such as the usages of the subjects after purchase.

Therefore, by compiling and analyzing the subject data that are transmitted accordingly from one or more folding devices 10, the server device 20 can properly understand the data relating to the purchased subjects.

The term "aggregate data" means, for example, data that include, for each of the types of the subjects, at least one of the followings: data indicating the result of aggregation of total numbers of processing performed by the folding device 10, data indicating the average of the total numbers of processing, and data indicating the average of the numbers of processing performed on the subjects for the each predetermined period.

The expression, "provide a predetermined company with analysis results", means transmitting an email containing the analysis results to the information processing device 30 of the predetermined company, printing the analysis results, mailing the printed matter to the predetermined company, and allowing the information processing device 30 of the predetermined company to be able to view the analysis results on the Web. The method of providing the analysis results is not limited as long as the predetermined company can understand the analysis results.

The server device 20 may be able to execute the aforementioned functions of compiling, analyzing and providing the data in one or more devices.

The information processing device 30 is a computer that is connected to the network N so as to be able to communicate with the server device 20. In the embodiment, the information processing device 30 is, for example, a computer of a company wishing to acquire the analysis results concerning the subjects thereof.

The company that acquires the analysis results concerning the subjects can consider strategies and the like for developing subjects, based on the analysis results.

The network N is a communication line or a communication network for information processing, such as the Internet or a LAN (local area network) constructed within a building. A specific configuration of the network N is not particularly limited and can be wired or wireless, as long as the network N is configured to enable transmission/reception of data among the folding device 10, server device 20, and information processing device 30.

In addition, the network N can be configured by a plurality of types of communication lines or communication networks, as well as various types of network equipment. Examples of the network N include a base station connected wirelessly to the folding device 10, an access point of a wireless LAN (WiFi router, etc.), a mobile communication network connected to the base station, a telephone line connected from the access point through a router or a modem, a public line such as a cable television line or an optical communication link, the Internet connected to the server device 20, and a gateway device connecting the mobile communication network or communication line to the Internet.

<Hardware Configuration>

Figure 2:
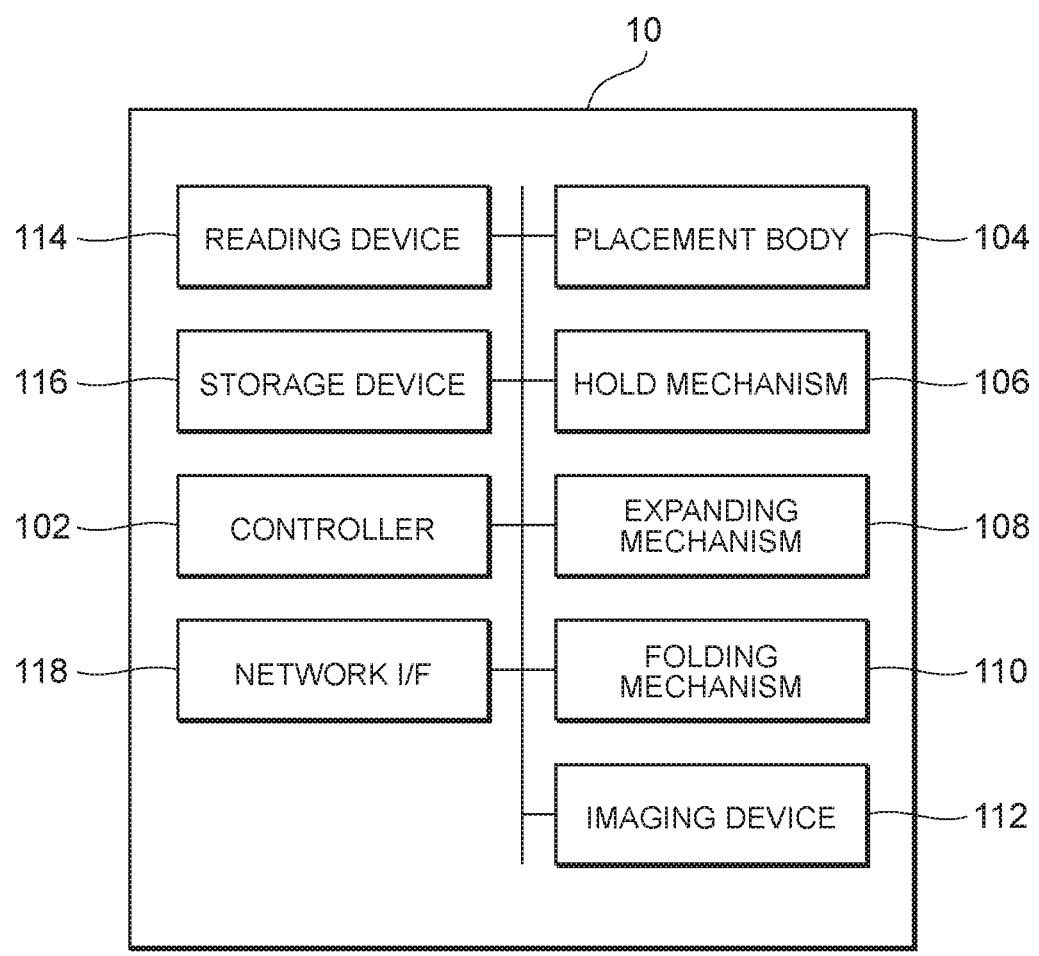
FIG. 2 is a diagram showing an example of the schematic configuration of hardware of a folding device according to the embodiment.

A hardware configuration of each of the devices provided in the data processing system 1 is described next. FIG. 2 is a diagram showing an example of a hardware configuration of the folding device 10 according to the embodiment. As shown in FIG. 2, the folding device 10 has, at least, a controller 102, a placement body 104, a hold mechanism 106, an expanding mechanism 108, a folding mechanism 110, an imaging device 112, a reading device 114, a storage device 116, and a network I/F (Interface) 118.

The controller 102 is, for example, a CPU (Central Processing Unit) for controlling the processing of expanding and folding subjects by using the recognition results of images captured by the imaging device 112. For example, the controller 102 recognizes an image of a subject placed on the placement body 104, detects the contour of the subject, and detects the edges of the subject. Based on the image recognition result of the subject, the controller 102 recognizes a position (e.g., an edge) of the subject that should be held or a position by which the subject should be folded, and controls the expanding mechanism and the folding mechanism.

The controller 102 also controls the related data read by the reading device 114, in such a manner that the related data are stored in the storage device 116. The controller 102 aggregates the related data stored in the storage device 116, to generate subject data. The controller 102 also performs control in such a manner that the subject data are transmitted to the server device 20 through the network I/F 118.

The placement body 104 is used for expanding or folding the subjects and is in the shape of a board, a plate, a rod, or a thread on which the subjects can be placed. The placement body 104 may be rotatable and/or movable, and the subjects are each placed thereon by a movement of the hold mechanism 106.

The hold mechanism 106 holds a part of a subject thrown into the device, the part being an edge, for example. The hold mechanism 106 is moved by the expanding mechanism 108, places the subject onto the placement body 104, and changes the held position of the subject so as to hold the edge of the subject.

The expanding mechanism 108 moves the hold mechanism 106 based on the image recognition result concerning the image of the subject placed on the placement body 104, the image recognition result being obtained by the controller 102, and expands the subject placed on the placement body 104. Eventually, one a predetermined edge of the subject is held and the subject is expanded, the type of the subject is recognized by image recognition. Once the type of the subject is recognized, a folded position of the subject is determined, whereby the subject can be folded based on this folded position.

The folding mechanism 110 folds the subject based on the folded position that is determined through the type recognition performed by the controller 102. A program that includes a process of folding subjects using the hold mechanism 106 and the placement body 104 may be set beforehand in the controller 102 with respect to the types of the subjects.

The imaging device 112 is provided in a position that enables capture an image of a subject placed on the placement body 104, captures an image of the subject at the right time, and outputs the captured image to the controller 102.

The reading device 114 is a device capable of reading the related data attached to a subject. For example, as long as a wireless IC chip such as an RFID (Radio Frequency IDentification) tag is attached to the subject as a medium for storing the related data, the reading device 114 may be a wireless IC chip reader. Also, for example, in a case where the related data are embedded in the subject by means of special paint, a pattern or the like, the reading device 114 may be an imaging device or photoreceiver capable of recognizing such special paint, pattern or the like.

The related data read by the reading device 114 may be used for rapidly expanding or folding the subjects. For example, by reading the type of a garment corresponding to the related data, the controller 102 can recognize the type of the garment more quickly and accurately than recognizing the type of the garment by means of image recognition.

The storage device 116 is, for example, a nonvolatile memory and stores the subject data. Moreover, the storage device 116 may store a control program and the like that are executed by the folding device 10.

The network I/F 118 is an interface provided between equipment with a communication function and the folding device 10. Furthermore, the network I/F 118 is connected by the network N such as a LAN (Local Area Network) or WAN (Wide Area Network) which is constructed by a data transmission channel such as a wired and/or wireless circuit.

See Patent Documents 2 to 4 for the details of a method for folding subjects. Any method may be used as the method for folding subjects. The folding device 10 may have a washing mechanism and a drying mechanism.

Figure 3:
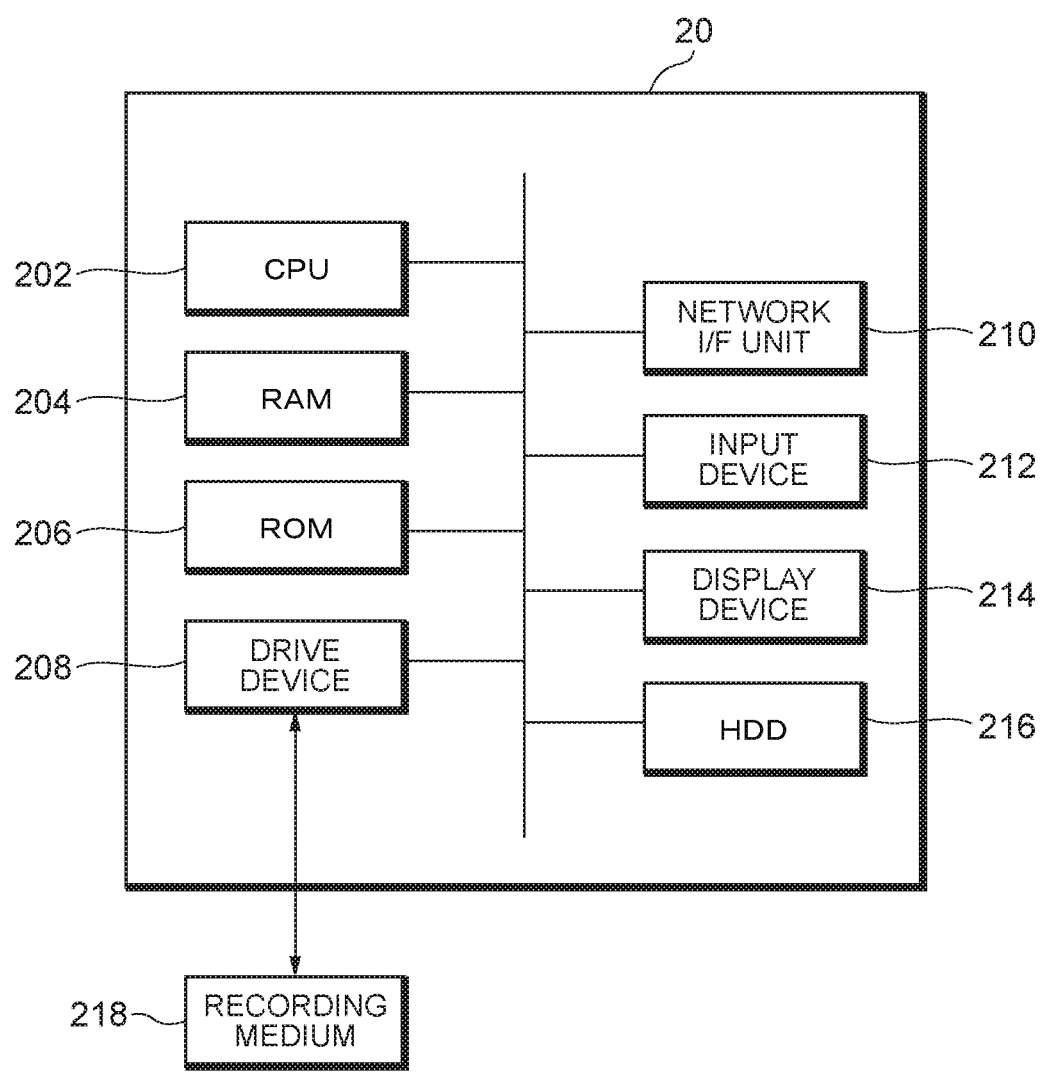
FIG. 3 is a diagram showing an example of the schematic configuration of hardware of a server device according to the embodiment.

A hardware configuration of the server device 20 is described next. FIG. 3 is a diagram showing an example of the schematic configuration of hardware of the server device 20 according to the embodiment.

As shown in FIG. 3, the server device 20 has a CPU 202, a RAM (Random Access Memory) 204, a ROM (Read Only Memory) 206, a drive device 208, a network I/F 210, an input device 212, a display device 214, and an HDD (Hard Disk Drive) 216. These components are connected by a bus so as to be able to mutually transmit and receive data.

The CPU 202 is a control unit for controlling each device and compute and process data within the computer. The CPU 202 is also an arithmetic apparatus that compiles the data stored in the RAM 204 or ROM 206 and executes an analytical processing program. The CPU 202 receives subject data from the network I/F 210 and the like, computes and processes the subject data, and outputs the computation result to the display device 214, the storage device, and the like.

The RAM 204 is, for example, a main storage unit or the like. The RAM 204 is a storage device for storing or temporarily saving data and programs such as an OS (Operating System) and application software, which are basic software executed by the CPU 202.

The ROM 206 is a storage device for storing data relating to, for example, the application software.

The drive device 208 reads programs from the recording medium 218, such as a CD-ROM or SD card, and installs the read programs on the storage device.

The recording medium 218 also stores a predetermined program therein, and this program stored in the recording medium 218 is installed on the server device 20 through the drive device 208. The installed predetermined program can be executed by the server device 20.

The network I/F 210 is an interface provided between peripheral equipment with a communication function and the server device 20. Also, the network I/F 210 is connected through the network N such as a LAN or WAN which is constructed by a data transmission channel such as a wired and/or wireless circuit.

The input device 212 includes a cursor key, a keyboard with numeric keys and various other functional keys, and a mouse or a slide pad for selecting a key on a display screen of the display device 214. The input device 212 is also a user interface for allowing the user to send an operation instruction to the CPU 202 or to enter data.

The display device 214 is configured by an LCD (Liquid Crystal Display) or the like and displays a screen corresponding to displayed data that are input from the CPU 202. The input device 212 and the display device 214 may be provided on the outside of the server device 20.

The HDD 216 is a storage device capable of storing a large volume of data. The HDD 216 stores, for example, aggregate data obtained by aggregating the subject data.
<Subject Attached With Related Data>

Figure 4:
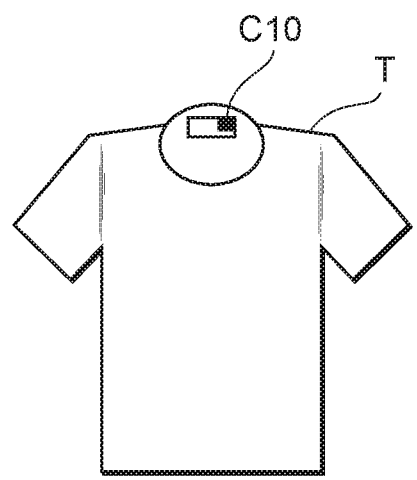
FIG. 4 is a diagram showing an example of a subject to which related data are attached.

FIG. 4 is a diagram showing an example of a subject to which the related data are attached. The example shown in FIG. 4 assumes that the subject T is a T-shirt and that the related data are stored in a wireless IC chip C10 embedded in a tag portion of the T-shirt. Note that the wireless IC chip C10 may be embedded in the subject T itself rather than the tag portion.

In this manner, the company that sells the subject T attaches to the subject T the wireless IC chip C10 in which the related data are stored. Examples of the related data include information such as the company name, the type of the garment (T-shirt, long-sleeve shirt, pants, skirt, towel, etc.), the shape, color, and size (measurements) of the garment. The folding device 10 can read the data from this wireless IC chip C10, promptly perform the processing of recognizing the type of the subject T, compile the read data, and categorize each subject.

When paying for the subject T at a cash register in a shop owned by the sales company, the data are read from the wireless IC chip C10 for the purpose of acquiring price information. In this case, the purchase date may be recorded in the wireless IC chip C10 by a reader/writer of the shop. Consequently, the server device 20 can execute an analysis using the purchase date. Hereinafter, assuming that the subject is a garment and that the related data are stored in the wireless IC chip, each of the functions of the data processing system 1 is described.
<Functional Configurations>

Figure 5:
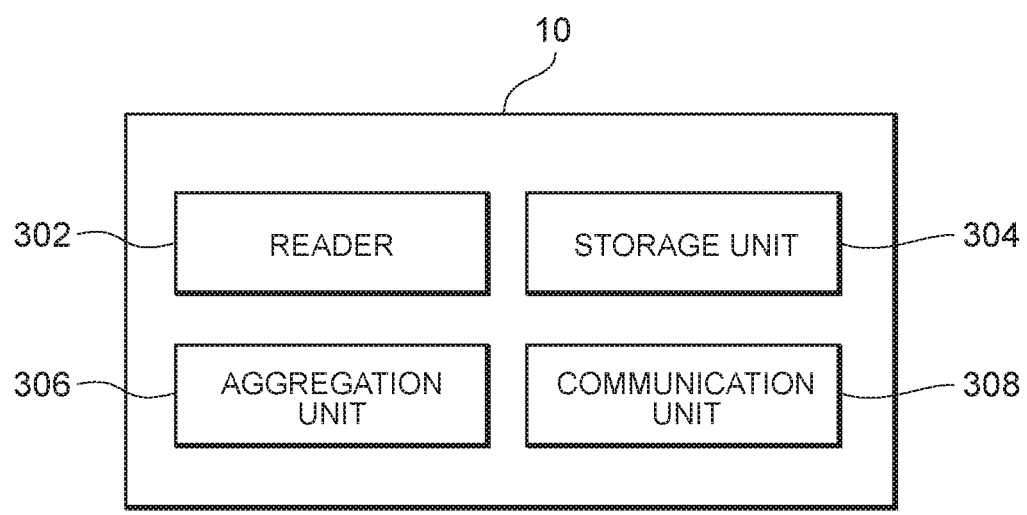
FIG. 5 is a diagram showing an example of a function concerning data processing performed by the folding device.

FIG. 5 is a diagram showing an example of a function concerning data processing performed by the folding device 10. In the example shown in FIG. 5, the folding device 10 has a reader 302, a storage unit 304, an aggregation unit 306, and a communication unit 308.

The reader 302 is realized by, for example, the reading device 114 or the like, to read the related data from the wireless IC chip of a subject. The read related data are stored in the storage unit 304. In a case where the user knows the position of the wireless IC chip, the user may bring the wireless IC chip close to the reader 302 when throwing the subject into the folding device 10, to cause the reader 302 to read the wireless IC chip.

The reader 302 may also read the related data from the wireless IC chip at a predetermined time during the process of expanding/folding the subject. For example, when expanding the subject for the last time, the subject is usually expanded in a predetermined position within the device, so that the position of the tag can easily be determined. Therefore, by causing the hold mechanism 106 to bring the determined position of the tag close to the position of the reader 302, the reader 302 can read the related data.

The storage unit 304 is realized by, for example, the storage device 116 or the like, to store the subject data including the related data read by the reader 302.

The aggregation unit 306 is realized by, for example, the controller 102 or the like, to count the number of times the related data are stored, for each piece of garment identification information of the related data. This stored number represents the number of times the subject is processed by the folding device 10 or the number of times the subject T is used by the user. Thus, the number of times the subject T is used after purchase can be analyzed.

The aggregation unit 306 may also count the number of times the related data are stored, for each predetermined period. Assuming that the predetermined period is a month, the aggregation unit 306 can count the number of times the subject is processed or used for each month. Therefore, the usage and the like of the subject for each season can be analyzed.

The communication unit 308 is realized by, for example, the network I/F 118 or the like, to transmit to the server device 20 the subject data stored in the storage unit 304. The timing at which the processed data are transmitted may be when the subject data are updated or the end or beginning of a month.

FIG. 6 is a diagram showing an example of the subject data stored in the storage unit 304. In the example shown in FIG. 6, the subject data include data such as a sales company, a garment ID, a garment type, a purchase date, a user, ongoing usage, a total number of processing operations, and a processing frequency.

The sales company data are data on the sales company of the garment. For example, the sales company data enable identification of Company A, Company B, Company C, Company D and the like.

The garment ID is identification information of each original garment owned by the sales company. In case of identical products of the same sales company, an identical garment ID may be attached, or a unique ID may be attached to each of the garments. In a case where a unique ID is attached to each garment, the type of each garment may be identified by a part of the ID. For example, the upper few digits of the ID can indicate the type of each garment, and the remaining digits can be made unique for each garment.

For example, data such as A-001, A-002, and A-003 are used as the garment IDs.

The garment type data are data for identifying garments such as a T-shirt, a long-sleeve shirt, pants, a skirt, and a towel.

The purchase date data are data on the purchase date that are acquired when the subject is paid for at a cash register in a shop owned by the sales company.

Examples of the user data include adult male, adult female, boy, and girl. A person who is likely to use the subject may be set as the user data by the sales company, or the user may be allowed to register the user data when causing the folding device 10 to read the user data.

The processing frequency data indicate the number of times the subject is thrown into the "folding device" and subjected to the folding processing, for each predetermined period. In the example shown in FIG. 6, the number of times is counted for each month.

The ongoing-usage data indicate "X" for a subject that is no longer used and "O" for a garment in use. For example, when the count value indicated by the processing frequency data is 0 for twelve months in a row, it is determined that the garment is no longer in use, and consequently "X" is set as the ongoing-usage data. In a case where the count value of any of the twelve months is 1 or higher, it is determined that the garment is in use, and consequently "O" is set as the ongoing-usage data.

The data on the total number of processing operations represent a total of the processing frequencies of the corresponding months in the processing frequency data. For example, in a case where the processing period indicated by the processing frequency data is a predetermined period or longer and the total number of processing operations is high, it can be estimated that the subject is excellent in durability or preferred by buyers.

In the example shown in FIG. 6, for the garment ID "A-001", for example, the processing frequency data indicate that the garment is folded five times in January 2010 and four times in April 2011. Let it be assumed that the garment with ID "A-001" is folded three times in March 2011 and is not used ongoingly thereafter.

In this case, because the garment ID "A-001" is not used for twelve straight months and thereafter, "X" is set as the ongoing-usage data. The total number of uses "43" from the five times in January 2010 to the three times in April 2012 is set as the data on the total number of processing operations.

The subject data shown in FIG. 6, for example, are transmitted from the folding device 10 of each household to the server device 20 and accordingly the server device 20 can easily acquire a large volume of subject data. Buyers basically only need to throw the subjects into the folding devices 10 after use; no troublesome processing is imposed on the buyers.

Figure 7:
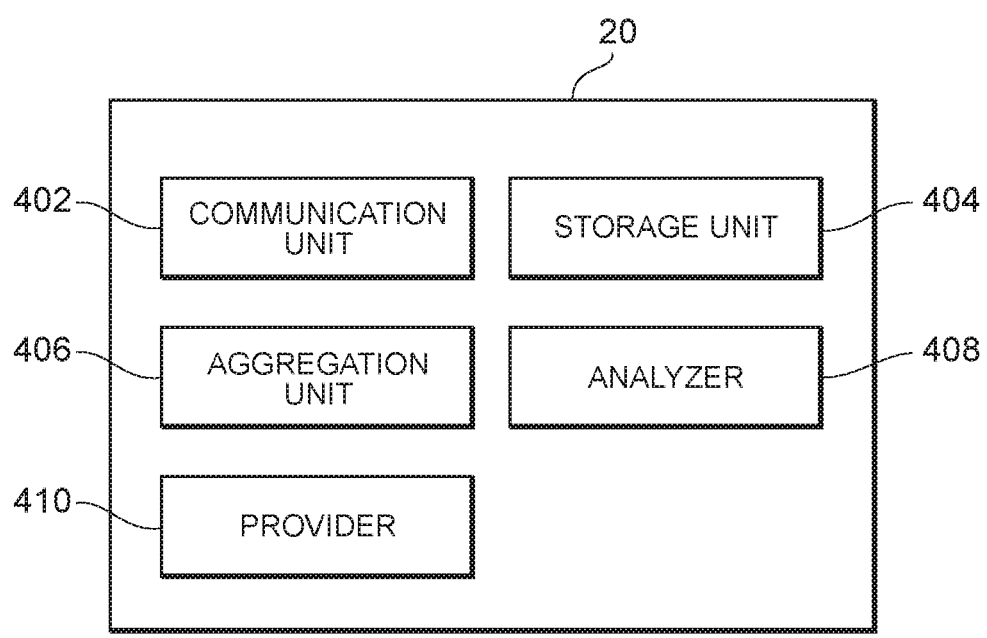
FIG. 7 is a diagram showing an example of a function concerning data processing performed by the server device according to the embodiment.

Each of the functions of the server device 20 is described next. FIG. 7 is a diagram showing an example of a function concerning data processing performed by the server device 20 according to the present embodiment. In the example shown in FIG. 7, the server device 20 has a communication unit 402, a storage unit 404, an aggregation unit 406, an analyzer 408, and a provider 410.

The communication unit 402 is realized by, for example, the network I/F 210 or the like, to receive the subject data and the like from the folding device 10. The communication unit 402 also transmits analysis results to the information processing device 30 by e-mail or the like. Therefore, the communication unit 402 functions as a transmitter and a communication unit.

The storage unit 404 is realized by, for example, the HDD 216, the RAM 204, or the ROM 206, to store the aggregate data obtained by aggregating the subject data.

The aggregation unit 406 is realized by, for example, the CPU 202, the RAM 204 functioning as a working memory, or the like, to perform aggregation of the predetermined data contained in the received subject data. By "perform aggregation", it means that the aggregation unit 406 counts the total numbers of processing and calculates the average thereof.

The aggregate data include, for each of the types of the subjects, at least one of the followings: first data indicating the result of aggregation of the total numbers of processing performed by the folding device 10, second data indicating the average of the total numbers of processing, and third data indicating the average of the numbers of processing for each predetermined period.

The analyzer 408 is realized by, for example, the CPU 202, the RAM 204 functioning as a working memory, or the like, to analyze predetermined data contained in the aggregate data. For example, by using the third data of the aggregate data, the analyzer 408 may analyze a usage timing at which a subject is used, and the number of times the subject is used at the usage timing. Accordingly, the trend of the subject and the preference of the user can be understood.

The analyzer 408 may also analyze the durability of a subject by using the first data or second data of the aggregate data. For example, in regards to a subject that is not currently used, it can be determined that the higher the total number of times the subject is processed by the folding device 10, the higher the durability thereof.

As a result of the foregoing analysis, the usage and the like of the subject after purchase can be analyzed by using the number of times the subject is processed by the folding device 10.

The provider 410 is realized by, for example, the CPU 202, the network I/F 210 or the like, to provide, for example, a predetermined information processing device 30 of a sales company with the results of analysis by the analyzer 408, by e-mail or the like. Consequently, the sales company can understand the data relating to the purchased subject and make use of the data in the strategy and the like for developing subjects.

FIG. 8 is a diagram showing an example of the aggregate data stored in the storage unit 404. In the example shown in FIG. 8, the aggregate data include data such as sales companies, garment types, garment IDs, users, the number of data aggregations, a total number of processing operations, and the number of uses per year.

In the example shown in FIG. 8, the sales company data are data on each "sales company" that are included in the subject data transmitted from the folding device 10 of each household. For example, the sales company data may be sorted for each sales company, such as Company A, Company B, Company C, and Company D.

The garment type data are data on "garment types" that are included in the subject data transmitted from the folding device 10 of each household. For example, the garment type data may be sorted for each garment type, such as T-shirts, long-sleeve shirts, pants, skirts, and towels.

The garment ID is "garment ID" that is included in the subject data transmitted from the folding device 10 of each household. For example, the data can be put together for each garment ID such as "A-001", "A-002", "A-003", "A-004", and "A-005".

The user data are data on "users" that are included in the subject data transmitted from the folding device 10 of each household. Examples of the user data include "adult male", "adult female", "boy", and "girl".

The number of data aggregations is data aggregated using the "ongoing usage" and "total number of processing operations" that are included in the subject data transmitted from the folding device 10 of each household. The category called "total number" in the number of data aggregations indicates a total number of times garments with the same garment ID are processed by the folding device 10 of each household.

The category called "usage ended" in the number of data aggregations means a total of the "total number of processing operations" corresponding to "X" marked in the "ongoing usage". The category called "in-use" in the total number of data aggregations means a total number of the "total number of processing operations" corresponding to "O" included in the subject data.

The total number of processing operations is the average value of the numbers of processing aggregated by using the "ongoing usage" and "total number of processing operations" that are included in the subject data transmitted from the folding device 10 of each household. The category called "total number" in the total number of processing operations indicates the average number of processing performed on garments with the same garment ID by the folding device 10 of each household.

The category called "usage ended" in the number of processing means the average value of the "total numbers of processing" corresponding to "X" marked in the "ongoing usage". The category called "in-use" in the total number of processing operations means the average value of the "total number of processing operations" corresponding to "O" included in the subject data.

There is a high possibility that the garments with high total numbers of processing can tolerate repeated use or the processing performed by the folding device 10 or are favorably used by buyers. On the other hand, there is a high possibility that the garments with low total numbers of processing cannot tolerate repeated use or the processing performed by the folding device 10 or are not preferred by buyers.

Of the "total number", "usage ended", and "in-use" of the total number of processing operations, the values of the "in-use" of the total number of processing operations can change over time. However, the values of the "usage ended" of the total number of processing operations rarely change unless the ongoing-usage data corresponding to an identical garment ID change from "X" to "O". Therefore, when comparing the total numbers of processing of garments with each other, an objective comparison can be realized by comparing the garments that are no longer in use; thus, it is desirable to compare the values of the "usage ended" of the total numbers of processing.

The number of processing for each year is the average number of processing performed on garments with the same garment ID for each year, which are included in the subject data transmitted from the folding device 10 of each household. A total value of the numbers of processing with respect to the years corresponds to the "total number" of the total number of processing operations.

<Analytical Processing A>

Specific examples of analytical processing performed on the aggregate data by the analyzer 408 are described next. Looking at the garments corresponding to "long-sleeve shirt" as the garment type and "adult male" as the users, in the analytical processing A, the analyzer 408 can filter only the relevant data.

FIG. 9 is a diagram showing an example of filtering results of the analytical processing A. In the example shown in FIG. 9, the analyzer 408 extracts only the data corresponding to the garment type "long-sleeve shirt" and the "adult male" users.

In addition, in the example shown in FIG. 9, the garment IDs corresponding to the garment type "long-sleeve shirt" and the "adult male" users are "A-001", "A-002", "A-010", "D-001", "D-002", and "D-003".

The values corresponding to the "usage ended" in the total numbers of processing are "72", "40", "19", "86", "94", and "102" in succession from the top. For the sales companies "Company A" and "Company D", the analyzer 408 performs the t-test on two samples out of the total numbers of processing having unequal distributions, and as a result, the p-value is 0.035 and the risk is 5% or less.

Therefore, it is clear that the total numbers of processing for the long-sleeve shirts for the adult males are higher in Company D than Company A. The analyzer 408 can also perform statistical processing such as the t-test, in addition to categorizing and picking out the necessary data.

The result of the aforementioned t-test shows that the long-sleeve shirts by Company D can tolerate repeated use or are likely to be favored by buyers, compared to the long-sleeve shirts by Company A. Thus, there is a high possibility that the long-sleeve shirts produced by the sales companies other than Company D are used many times by buyers after purchase, by using as a reference the design, materials and the like of the long-sleeve shirts of Company D.

Having a subject used many times after purchase is considered to lead to the improvement of the image, brand power, and future sales of the sales company producing the subject. The sales company can estimate which sales company has good designs, materials and the like, by evaluating the differences between the sales company and the other companies.

The values of the "usage ended" in the total number of processing operations for the garment IDs "D-001", "D-002", and "D-003" of "Company D" are "86", "94", and "102", whereas the values of the "usage ended" in the total number of processing operations for the garment IDs "A-001", "A-002", and "A-010" of "Company A" are "72", "40", and "19".

In Company A, the garment with the garment ID "A-001" is used or processed the most, and the total number of processing operations decreases in the order of the garment ID "A-002" and the garment ID "A-010". In addition, as far as Company A is concerned, the differences among between the values of the "usage ended" in the total number of processing operations are substantial. In other words, Company A can develop a sales strategy for long-sleeve shirts for adult males in the future by using the design, material and the like of the garment ID "A-001" as a reference.

Moreover, in a year-on-year comparison between the numbers of processing, the numbers of processing for the long-sleeve shirts by Company A show a decreasing trend each year. It should be noted that this decreasing trend is considered normal. The reason is because the number of times the subject is used decreases as time advances after purchase.

On the other hand, the numbers of processing for the long-sleeve shirts by Company D increase significantly in 2011. It is preferred that a variance analysis, for example, be performed as a comparison analysis of the number of processing for each year. Long-sleeve shirts tend to be used in fall, winter and spring. Therefore, if the winter of 2011 was particularly cold, then there is a high possibility that the buyers evaluated the long-sleeve shirts of Company D as more resistant to cold temperatures than the long-sleeve shirts of Company A.

<Analytical Processing B>

Looking at the garments corresponding to "long-sleeve shirt" as the garment type and "adult female" as the users, in the analytical processing B, the analyzer 408 can filter only the relevant data.

FIG. 10 is a diagram showing an example of filtering results of the analytical processing B. In the example shown in FIG. 10, the analyzer 408 extracts only the data corresponding to the garment type "long-sleeve shirt" and the "adult female" users.

In addition, in the example shown in FIG. 10, the garment IDs corresponding to the garment type "long-sleeve shirt" and the "adult female" users are "B-001", "B-002", "B-003", "B-004", "B-005", "B-006", "C-001", "C-002", "C-003", and "C-004".

The values corresponding to the "usage ended" of the total numbers of processing are "29", "76", "30", "89", "29", "68", "14", "18", "17", and "15" in succession from the top. For the sales companies "Company B" and "Company C", the analyzer 408 performs the t-test on two samples out of the total numbers of processing having unequal distributions, and as a result, the p-value is 0.01 and the risk is 5% or less.

Therefore, it is clear that the total numbers of processing for the long-sleeve shirts for the adult females are higher in Company B than Company C.

The result of the aforementioned t-test shows that the long-sleeve shirts by Company B can tolerate repeated use or are likely to be favored by buyers, compared to the long-sleeve shirts by Company C. Thus, there is a high possibility that the long-sleeve shirts produced by the sales companies other than Company B are used many times by buyers after purchase, by using as a reference the designs, materials and the like of the long-sleeve shirts of Company B.

The values of the "usage ended" in the total number of processing operations for the garment IDs "B-002", "B-004", and "B-006" of "Company B" are "76", "89", and "68", whereas the values of the "usage ended" in the total number of processing operations for the garment IDs "B-001", "B-003", and "B-005" are "29", "30", and "29". For these two groups, the analyzer 408 performs the t-test on two samples out of the total numbers of processing having unequal distributions, and as a result, the p-value is 0.008 and the risk is 5% or less.

Therefore, it is clear that the total numbers of processing for the garments no longer in use are higher in the group of "B-002", "B-004", and "B-006" than the group of "B-001", "B-003", and "B-005".

Hence, Company B can, for example, compare the group of the garment IDs "B-002", "B-004", and "B-006" with the group of the garment IDs "B-001", "B-003", and "B-005", and thereby develop a sales strategy for long-sleeve shirts for adult males in the future by using the designs, materials and the like of these two groups as a reference.

Moreover, in a year-on-year comparison between the numbers of processing, the numbers of processing for the long-sleeve shirts by Company C show a decreasing trend each year.

For the long-sleeve shirts by Company B, on the other hand, when comparing the number of uses for each year, the numbers of processing for 2012 is higher than the numbers of processing for the other years. If the winter of 2012 was particularly cold, then there is a high possibility that the buyers evaluated the long-sleeve shirts of Company B as more resistant to cold temperatures than the long-sleeve shirts of Company C.

In this manner, the analyzer 408 can execute a data analysis focusing on predetermined companies, predetermined data and the like, thereby providing information beneficial for the sales companies.

<Operations>

Figure 11:
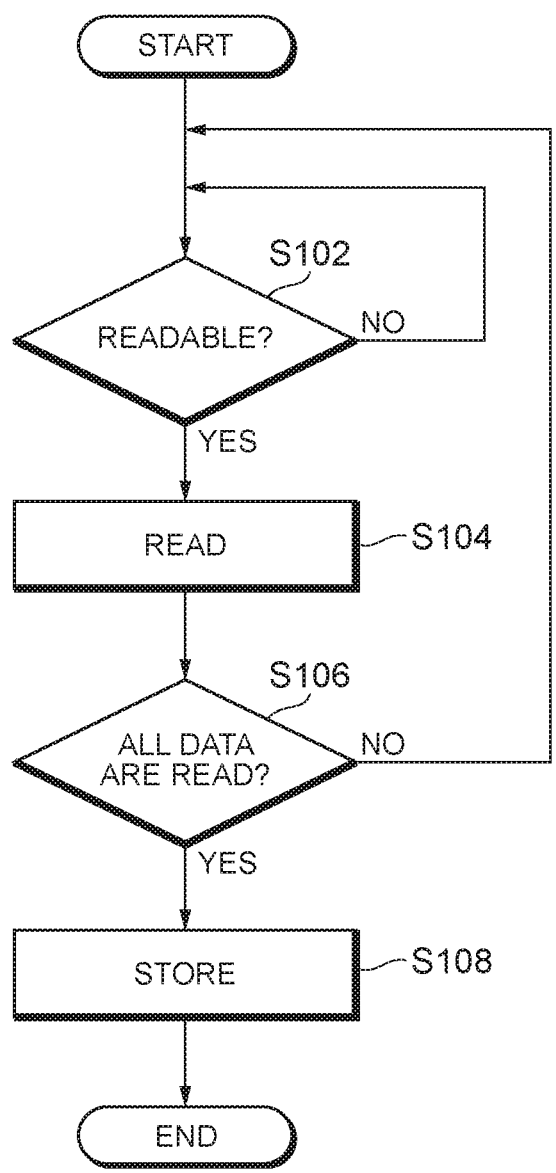
FIG. 11 is a flowchart showing an example of reading processing by the folding device according to the embodiment.

Each of the operations of the data processing system 1 is described next. FIG. 11 is a flowchart showing an example of reading processing by the folding device 10 according to the embodiment. For example, the processing shown in FIG. 11 is executed each time when the user throws a subject into the folding device 10 or when the hold mechanism 106 holding a subject moves to the position of the reading device 114.

In step S102, the reader 302 determines whether the related data of a subject that are attached to the subject are readable or not. For example, the reader 302 determines that the related data are readable when the reading device 114 and the wireless IC chip having the related data stored therein are located within a predetermined distance. If readable (step S102-YES), the processing advances to step S104, but if not readable (step S102-NO), the processing returns to step S102.

In step S104, the reader 302 reads the related data from the subject.

In step S106, the reader 302 determines whether all the related data are read or not. In order to determine whether all the related data are read or not, the reader 302 may, for example, determine that all the related data are read when a predetermined time period elapses since the last reading, or determine that all the related data are read when a button or the like provided in the folding device 10 is pressed. If all the related data are read (step S106-YES), the processing advances to step S108, and if all the related data are not read (step S106-NO), the processing returns to step S102.

In step S108, the reader 302 stores all the read data in the storage unit 304. Note that step S106 and step S108 may be alternated. The processing shown in FIG. 11 can cause the folding device 10 to read the related data without imposing troublesome processing on the user.

Figure 12:
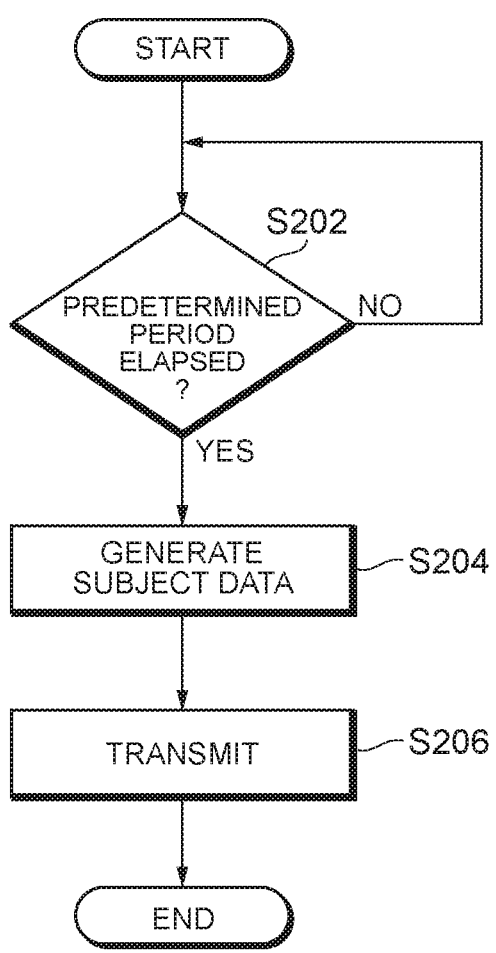
FIG. 12 is a flowchart showing an example of processing of transmitting the subject data by the folding device according to the embodiment.

FIG. 12 is a flowchart showing an example of processing of transmitting the subject data by the folding device 10 according to the embodiment. The processing shown in FIG. 12 is executed at, for example, a predetermined timing.

In step S202, the aggregation unit 306 uses an internal timer to determine whether a predetermined period elapses or not. The predetermined period is, for example, January. If the predetermined period elapses (step S202-YES), the processing advances to step S204, and if the predetermined period does not elapse (step S202-NO), the processing returns to step S202.

In step S204, the aggregation unit 306 counts the number of times the related data are stored within a predetermined time period, aggregates the total number of processing operations and processing frequency based on this counted value, set the ongoing-usage data, and generates the subject data.

In step S206, the communication unit 308 transmits the generated aggregate data to the server device 20. Note that the generation of the subject data may be carried out each time when the related data are stored. In addition, the processing of step S202 may be replaced with determining whether new related data are stored or not.

The processing shown in FIG. 12 can cause the folding device 10 to generate the subject data for analyzing a subject after purchase and transmit the subject data to the server device 20.

Figure 13:
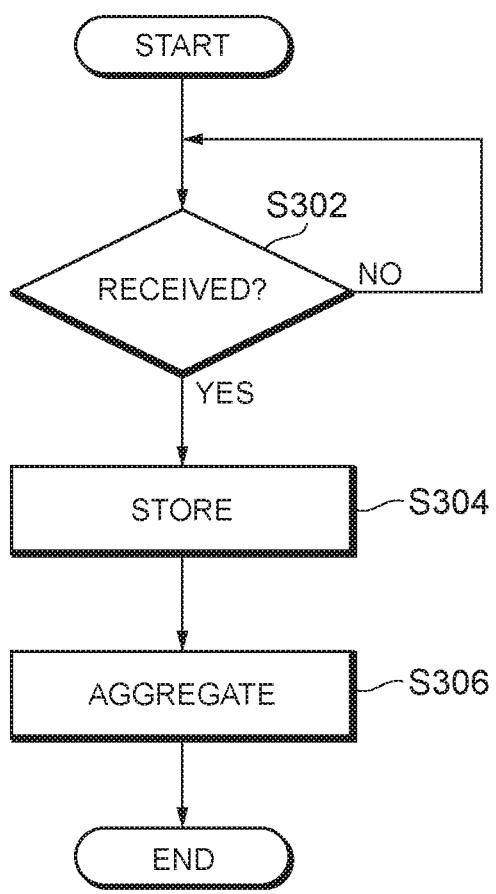
FIG. 13 is a flowchart showing an example of processing of receiving the subject data by the server device according to the embodiment.

FIG. 13 is a flowchart showing an example of processing of receiving the subject data by the server device 20 according to the embodiment. The processing shown in FIG. 13 is executed each time when the subject data are received from the folding device 10 of each household.

In step S302 shown in FIG. 13, the communication unit 402 determines whether or not the subject data are received from the folding device 10 of each household. If the subject data are received (step S302-YES), the processing advances to step S304, and if the subject data are not received (step S302-NO), the processing returns to step S302.

In step S304, the storage unit 404 stores the received subject data.

In step S306, the aggregation unit 406 aggregates the data based on the stored subject data, to generate aggregate data.

The processing shown in FIG. 13 can cause the server device 20 to acquire the subject data from the folding device 10 of each household and compile the acquired subject data.

Figure 14:
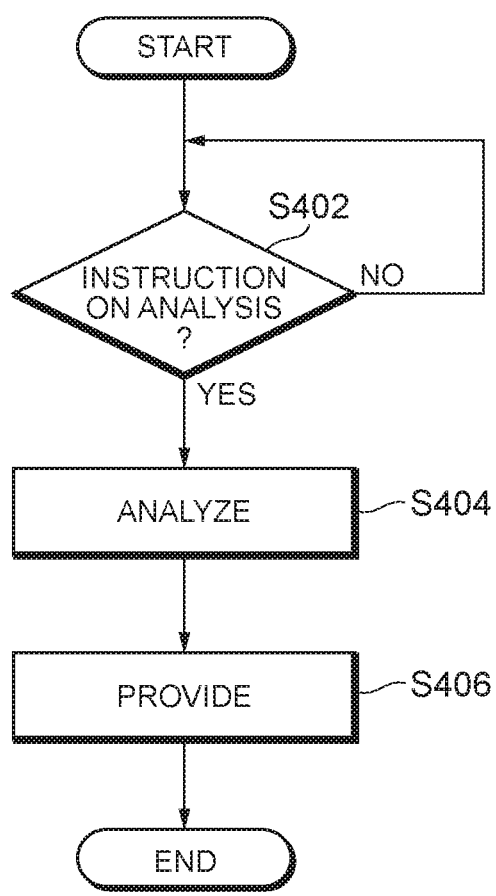
FIG. 14 is a flowchart showing an example of analytical/providing processing by the server device according to the embodiment.

FIG. 14 is a flowchart showing an example of analytical/providing processing by the server device 20 according to the embodiment. The processing shown in FIG. 14 is executed when an administrator or the like instructs on an analysis that uses the aggregate data.

In step S402 shown in FIG. 14, the analyzer 408 determines whether the analysis is instructed by an operation by the administrator or the like. The instruction on the analysis includes selecting predetermined data from the aggregate data or selecting the statistical processing. If the instruction on the analysis is sent (step S402-YES), the processing advances to step S404, and if the instruction on the analysis is not sent (step S402-NO), the processing returns to step S402.

In step S404, the analyzer 408 performs predetermined analytical processing. For example, the analyzer 408 selects a subject ID, selects a subject type, performs the t-test, or performs a variance analysis.

In step S406, the provider 410 provides a predetermined sales company with the analysis results from the analyzer 408.

The processing shown in FIG. 14 can cause the server device 20 to perform an analysis concerning a subject after purchase, and sales companies, provided with the analysis results, can make use of the analysis results in developing subjects and the like.

According to the data processing system of the embodiment described above, the subject data that can be acquired by the folding device of each household can be compiled in databases on the network and categorized by sales companies, garment types and the like of focus, whereby usage information on subjects can be obtained accurately.

The data obtained from the folding device are larger in amount and more reliable compared to data obtained through surveys or fixed-point observations by observers, because the data obtained from the folding device are based on objective values. A comparison between sales companies and a comparison between the numbers of uses of products produced by the same sales company, can be performed. The results obtained by evaluating these differences can be utilized in the strategy for developing garments so that the garments are used more frequently after purchase. Consequently, this can contribute to the improvement of the image, brand power, and future sales of garment sales companies.

In a case where the folding device 10 is configured to use data of the related data and the like in order to recognize the subjects or sorting the folded subjects, the present invention can be implemented by attaching, to the read related data, for other purposes, the number of processing performed by the folding device 10, which is data requested by a sales company, for example, and transmitting the resultant data to the server device 20.

As to the program that is executed by the server device 20 to process data, the CPU 202 reads this program from the ROM 206 and executes this program, whereby one or more of the aforementioned components are loaded on the RAM 204, and one or more of the components are generated on the RAM 204.

As described above, the data processing described in the embodiment may be realized as a program executed by the computer. The data processing described above can be realized by installing this program from a server or the like and causing the computer to execute this program.

Furthermore, the data processing described above can be realized by recording this program in the recording medium 218 and causing the computer to read the recording medium 218 in which this program is recorded.

Note that recording media for recording information optically, electrically or magnetically, such as CD-ROMs, flexible disks, and magneto-optical disks, semiconductor memories for recording information electrically, such as ROMs and flash memories, and various other types of recording media, can be used as the recording medium 218.

The folding device 10 according to the embodiment described above may be a washing machine, a dryer, or a washer dryer. The washing machine, dryer, or washer dryer can achieve the effects same as those of the aforementioned embodiment by having a reading device for reading the related data and transmitting to the server device the subject data that include the related data read by the reading device. The washer, dryer, washer dryer, and folding device are also collectively referred to as a processing device for processing subjects. Specifically, this processing device is capable of executing at least one of the following processing: washing, dehydrating, drying, expanding, folding, sorting and the like.

Examples have been described above in detail, but the present invention is not limited to the foregoing examples; thus, in addition to these examples, various modifications and changes can be made as described below, within the scope described in patent claims.

Modifications

The subject data described in the embodiment may include data relating to folding of a subject. The analyzer 408 may perform an analysis by using the data relating to folding. The data relating to folding of a subject include data that can be acquired using an image captured by the imaging device 112 of the folding device 10 and data that can be acquired by means of a load sensor provided in the hold mechanism 106 or placement body 104.

The data that can be acquired using a captured image of a subject include at least one of the followings: data on stains, data on damage, data on wrinkles, data on a shape change (including stretching and shrinking), data on color loss, and data on color transfer.

For example, the controller 102 can detect stains and damage by recognizing the design or pattern of a garment from the garment ID thereof and collating the data on the design or pattern with the image recognition result. The data on the detected stains or damage are included in the subject data.

The sales companies can take the stains, the total number of processing operations and the like collectively into consideration to understand, for example, how much a garment with special coating needs to be used until the special coating comes off.

The sales companies can also take the damage, the total number of processing operations and the like collectively into consideration to understand, for example, how much a garment advertising damage resistance needs to be used to get damaged.

The controller 102 can detect wrinkles by extracting edges from the captured image and collating the recognition results of the design and pattern of the garment acquired through the garment ID or the like with the edges. The data on the detected wrinkles are included in the subject data.

The sales companies can take wrinkles, the total number of processing operations and the like collectively into consideration to understand, for example, how much a garment needs to be used to until wrinkles are formed thereon.

With regard to the shape change, the controller 102 can calculate data relating to the shape of a garment, including the length and width of the garment, from a captured image of the garment. The calculated shape data are included in the subject data.

The sales companies can take the shape data, the total number of processing operations and the like collectively into consideration to understand, for example, how much a garment needs to be used to until a shape change thereof occurs.

With regard to the color loss and color transfer, the controller 102 can detect a color loss or color transfer of the same garment by collating the recognition result of the design and pattern of the garment acquired through the garment ID or the like with the image recognition result. The data relating to the detected color loss or color transfer are included in the subject data.

The sales companies can take the data relating to the color loss or color transfer, the total number of processing operations and the like collectively into consideration to understand, for example, how much a garment needs to be used until the color thereof changes.

Moreover, the weight of a subject can be measured by the load sensor provided in the hold mechanism 106 or placement body 104. The data on the measured weight of the subject are included in the subject data.

The sales companies can take the weight data, the total number of processing operations and the like collectively into consideration to understand, for example, how much a garment needs to be used until the garment does not dry as easily anymore.

When determining the type of a garment by image recognition of the subject to be folded, the controller 102 of the folding device 10 may collate the garment type included in the related data with the determined garment type, and, when these types are different from each other, prioritize the type obtained through image recognition. In such a case, if the folding device 10 has the wireless IC chip reader/writer, an error in the garment type stored in the wireless IC chip can be corrected.

The related data on a plurality of garments that are stored in the folding device 10 can be saved in another storage medium. For example, in a case where an interface with an external storage medium is provided in the folding device 10, the related data can be stored in the external storage medium through this interface.

Examples of the external storage medium include a storage medium of a cellular phone such as a smartphone, an SD card, and a USB memory.

Next, for example, in a case where other folding devices are installed in self-service laundries or accommodations, the time required to fold a garment can be reduced by inputting, to the other folding devices, the related data stored in the external storage media. The reason is because as a result of inputting the related data, the folding devices can be notified beforehand of the garments that are likely to be folded. Unlike when the folding devices have not pre-existing information on the subjects to be thrown in, candidates to be folded can be narrowed down, thereby reducing the time required for folding the subjects.

In addition, inputting the related data into the other folding devices eliminates the need to throw subjects into these folding devices one at a time; the folding devices can acquire the related data without imposing troublesome processing on the users.

Moreover, the data relating to folding of a subject may be the number of changes in the holding position of the hold mechanism 106, which is the number of times it takes to determine the type of a subject. The analyzer 408 may perform an analysis by using the data relating to folding. Accordingly, when the manufacturer of the folding device 10 is provided with a subject with a high number of changes, an evolutionary algorithm or the like of the subject with a high number of changes triggers a correction to lower the number of changes.

In a case where the folding device 10 is provided with a washing and/or drying function, the reading device reads the related data at the time of washing and/or drying, and the reading device reads the related data at the time of folding, thereby analyzing the difference between the related data read at these two time points. For example, an analysis can be performed to find, from among the subjects to be washed and/or dried, what types of subjects are not folded due to being taken out by the users before being folded.

In the related data shown in FIG. 6 described in the embodiment, the processing frequency may include only the recent month. The processing frequencies of the previous months may be included in the aggregate data in the server device 20. In the related data, the data on the garment types and users may be an attribute that enables specification of garment IDs. In this case, the data on the garment types and users do not need to be included in the related data.

With regard to the user data, an actual user may be recorded in the wireless IC chip or the like using the reader/writer in the folding device 10. In this case, different users exist for the same subject ID, and the user data are managed and aggregated separately in the aggregate data.

Accordingly, even for subjects with an identical subject ID, the usages and the like corresponding to different users can be understood.

Furthermore, the server device 20 may have an aggregation function of the folding device 10. In this case, the folding device 10 transmits the read related data to the server device 20 each time when the related data are read, and the server device 20 counts and aggregates the related data.

In addition, family attributes may be recorded in the wireless IC chip of a subject by a user operation of the reader/writer of the folding device 10. Examples of the attributes include father, mother, son 1, and son 2. In this case, the family attributes may be added to the subject data. Accordingly, the usage of a subject by each individual family member can be analyzed.

Additionally, the types of subjects that are included in the related data read by the folding device 10 may be collated with the results of determining the types by image recognition of the subjects. This enables to determine whether the results of determining the types through image recognition are correct or not.

In a case where the folding device 10 automatically reads the related data from subjects, the reading device 114 may be provided in the placement body 104 or the hold mechanism 106.

As described above, the embodiment and modification are merely illustrative for the purpose of explaining the present invention and not intended to limit the present invention to the embodiment and modifications; the present invention can be modified in various ways without departing from the gist thereof.

REFERENCE SIGNS LIST

10 Folding device
20 Server device
114 Reading device
202 CPU
204 RAM
206 ROM
216 HDD
402 Communication unit
404 Storage unit
406 Aggregation unit
408 Analyzer
410 Provider

What is claimed is:

1. A server device, comprising:
a central processing unit (CPU);
a receiver that receives subject data for each of a plurality of types of subjects, which are generated by and transmitted from one or more folding machines for folding subjects and that include related data on the subjects which are read from the subjects by a reading device of the one or more folding machines,
wherein the one or more folding machines (i) fold the subjects using one or more folding subject processing operations, (ii) read identification data from the subjects while folding the subjects, and (iii) generate the subject data, based on the identification data, including data related to a number of the folding subject processing operations and data indicating a result of a determination made by the one or more folding machines on whether each folding subject is ongoingly used by a user or not by determining a count value within a predetermined time frame;
a storage unit that stores aggregate data obtained by aggregating the subject data indicative of the folding subject processing operations, wherein the aggregate data includes for each of the types of the subjects:
first data indicating a result of aggregation of a total number of folding subject processing operations for subjects indicated as not ongoingly used,
second data indicating an average of the total number of folding subject processing operations for subjects indicated as not ongoingly used, and
third data indicating an average of a number of folding subject processing operations for each of a plurality of predetermined periods;
an analyzer that filters and extracts data corresponding to one type of among the types of the subjects contained in the aggregated data to perform an analysis on extracted data wherein the analyzer uses the third data to analyze a usage timing at which each of the subjects is used and a number of times each of the subjects is used at the corresponding usage timing, and uses the first data or the second data to determine durability of each of the subjects indicated as not ongoingly used by the user; and
a provider that provides a result of the analysis by the analyzer to a predetermined information processing device.

2. The server device according to claim 1, wherein the related data include at least one of the following: data on a sales company selling the subjects, identification information of the subjects, data on types of the subjects, data on purchase dates of the subjects, and data on users who use the subjects.

3. The server device according to claim 1, wherein the subject data include at least one of the following: a number of processing performed on each of the subjects by the folding machine for each predetermined period, a total number of processing operations performed on each of the subjects by the folding machine, and data indicating whether the subjects are ongoingly used or not.

4. The server device according to claim 1, wherein the subject data include data relating to folding of the subjects, and the analyzer performs an analysis concerning the subjects by using the data relating to folding of the subjects.

5. The server device according to claim 4, wherein the data relating to folding of the subjects include at least one of the following with regard to each of the subjects: data on stains, data on damage, data on wrinkles, data on a shape change, data on color loss, data on color transfer, and data on weight.

6. A data providing method executed by a computer, the method comprising the steps of:
receiving subject data for each of a plurality of types of subjects, which are generated by and transmitted from one or more folding machines for folding subjects and that include related data on the subjects which are read from the subjects by a reading device on the one or more folding machines, wherein the one or more folding machines (i) fold the subjects using one or more folding subject processing operations, (ii) read identification data from the subjects while folding the subjects, and (iii) generate the subject data, based on the identification data, including data related to a number of the folding subject processing operations and data indicating a result of a determination made by the one or more folding machines on whether each folding subject is ongoingly used by a user or not by determining a count value within a predetermined time frame;

storing, in a storage unit, aggregate data obtained by aggregating the subject data indicative of the folding subject processing operations, wherein the aggregate data includes for each of the types of the subjects:

first data indicating a result of aggregation of a total number of folding subject processing operations for subjects indicated as not ongoingly used, second data indicating an average of the total number of folding subject processing operations for subjects indicated as not ongoingly used, and third data indicating an average of a number of folding subject processing operations for each of a plurality of predetermined periods;

filtering and extracting data corresponding to one type of among the types of the subjects contained in the aggregated data to perform an analysis on extracted data, wherein the third data is used to analyze a usage timing at which each of the subjects is used and a number of times each of the subjects is used at the corresponding usage timing, and the first data or the second data is used to determine durability of each of the subjects indicated as not ongoingly used by the user; and providing a result of the analysis to a predetermined information processing device.

7. A data processing system in which one or more folding machines for folding a plurality of types of subjects and a server device are connected by a network, the data processing system comprising:

one or more folding machines that (i) fold subjects using one or more folding subject processing operations, (ii) read identification data from the subjects while folding the subjects, which are read from the subjects by a reading device on the one more folding machines and (iii) generate subject data, based on the identification data, indicating the folding subject processing operations;

a transmitter that transmits, to the server device, subject data generated by the one or more folding machines, for each of a plurality of predetermined periods;

a receiver that receives the subject data generated by and transmitted by the transmitter;

a storage unit that stores aggregate data obtained by aggregating the subject data including data related to the number of the folding subject processing operations and data indicating a result of a determination made by the one or more folding machines on whether each folding subject is ongoingly used by a user or not by determining a count value within a predetermined time frame, wherein the aggregate data includes for each of the types of the subjects:

first data indicating a result of aggregation of a total number of folding subject processing operations for subjects indicated as not ongoingly used, second data indicating an average of the total number of folding subject processing operations for subjects indicated as not ongoingly used, and third data indicating an average of a number of folding subject processing operations for each predetermined period;

an analyzer that filters and extracts data corresponding to one type of among the types of the subjects contained in the aggregated data to perform an analysis on extracted data, wherein the analyzer uses the third data to analyze a usage timing at which each of the subjects is used and a number of times each of the subjects is used at the corresponding usage timing, and uses the first data or the second data to determine durability of each of the subjects indicated as not ongoingly used by the user; and a provider that provides a result of the analysis by the analyzer to a predetermined information processing device.

* * * * *